(12) United States Patent
Yang

(10) Patent No.: US 11,197,186 B2
(45) Date of Patent: Dec. 7, 2021

(54) METHOD FOR SETTING MEASUREMENT INTERVAL AND NETWORK DEVICE

(71) Applicant: Guangdong OPPO Mobile Telecommunications Corp., Ltd., Guangdong (CN)

(72) Inventor: Ning Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/862,258

(22) Filed: Apr. 29, 2020

(65) Prior Publication Data

US 2020/0260315 A1 Aug. 13, 2020

Related U.S. Application Data

(63) Continuation of application No. PCT/CN2017/110254, filed on Nov. 9, 2017.

(51) Int. Cl.
*H04W 24/10* (2009.01)
*H04W 4/12* (2009.01)
(Continued)

(52) U.S. Cl.
CPC ............ *H04W 24/10* (2013.01); *H04W 4/12* (2013.01); *H04W 72/0453* (2013.01); *H04W 72/085* (2013.01)

(58) Field of Classification Search
None
See application file for complete search history.

(56) References Cited

U.S. PATENT DOCUMENTS 10,278,147 B2 * 4/2019 Zeng ................. H04W 36/0088
2010/0316000 A1 12/2010 Burbidge et al.
(Continued)

FOREIGN PATENT DOCUMENTS

CN 1375171 A 10/2002
CN 102026232 A 4/2011
(Continued)

OTHER PUBLICATIONS

International Patent Application No. PCT/CN2017/110254, International Search Report, dated Jun. 1, 2018, 2 pages.
(Continued)

*Primary Examiner* — Jamaal Henson
(74) *Attorney, Agent, or Firm* — Bayes PLLC

(57) ABSTRACT

A method for frequency measurement and a network device are provided. The method includes generating, by a first network device, indication information, where the indication information is used for indicating the terminal device to measure a first frequency at which a second network device is located, the first network device being a network device in a long term evolution (LTE) system, and the second network device being a network device in a new radio (NR) system; and transmitting, by the first network device, the indication information to the terminal device. In the implementations of the present disclosure, when needing the terminal device to measure the first frequency at which the second network device is located, the first network device transmits, to the terminal device, the indication information, which is used for indicating the terminal device to measure the first frequency.

11 Claims, 7 Drawing Sheets

(51) Int. Cl.
*H04W 72/04* (2009.01)
*H04W 72/08* (2009.01)

(56) References Cited

U.S. PATENT DOCUMENTS

| | | | | |
|---|---|---|---|---|
| 2011/0189998 | A1* | 8/2011 | Joo | H04W 24/00 |
| | | | | 455/444 |
| 2012/0252442 | A1 | 10/2012 | Fu et al. | |
| 2014/0146699 | A1 | 5/2014 | Axmon et al. | |
| 2014/0228027 | A1 | 8/2014 | Kuo | |
| 2015/0124664 | A1 | 5/2015 | Park | |
| 2015/0208366 | A1* | 7/2015 | Papasakellariou | H04L 1/1861 |
| | | | | 370/311 |
| 2015/0223088 | A1* | 8/2015 | Niu | H04W 24/10 |
| | | | | 370/252 |
| 2015/0351132 | A1 | 12/2015 | Park et al. | |
| 2016/0192367 | A1 | 6/2016 | Xue | |
| 2016/0219475 | A1 | 7/2016 | Kim | |
| 2016/0227571 | A1 | 8/2016 | Baek et al. | |
| 2016/0337916 | A1* | 11/2016 | Deenoo | H04W 36/0088 |
| 2017/0005740 | A1* | 1/2017 | Yang | H04L 5/1469 |
| 2017/0150462 | A1 | 5/2017 | Zeng et al. | |
| 2017/0164419 | A1 | 6/2017 | Kim | |
| 2017/0171771 | A1* | 6/2017 | Jung | H04W 24/10 |
| 2018/0063736 | A1 | 3/2018 | Sadeghi et al. | |
| 2018/0227973 | A1 | 8/2018 | Tsuboi et al. | |
| 2018/0279403 | A1 | 9/2018 | Kim | |
| 2018/0302818 | A1* | 10/2018 | Wu | H04W 76/10 |
| 2018/0324624 | A1* | 11/2018 | Gu | H04W 76/15 |
| 2019/0059046 | A1 | 2/2019 | Virtej et al. | |
| 2019/0230580 | A1 | 7/2019 | Kim et al. | |
| 2019/0364451 | A1 | 11/2019 | Yang | |

FOREIGN PATENT DOCUMENTS

| | | |
|---|---|---|
| CN | 103037399 A | 4/2013 |
| CN | 103404072 A | 11/2013 |
| CN | 103888987 A | 6/2014 |
| CN | 105228198 A | 1/2016 |
| CN | 105981257 A | 9/2016 |
| CN | 106211230 A | 12/2016 |
| CN | 106233765 A | 12/2016 |
| CN | 106358238 | 1/2017 |
| CN | 106559847 | 4/2017 |
| CN | 106792786 | 5/2017 |
| CN | 107113647 | 8/2017 |
| EP | 3 107 328 A1 | 12/2016 |
| JP | 2017519400 A | 7/2017 |
| JP | 2017528054 A | 9/2017 |
| JP | 2019519175 A | 7/2019 |
| KR | 20150005458 A | 1/2015 |
| RU | 2540118 C2 | 2/2015 |
| TW | 201703453 A | 1/2017 |
| WO | 2012171542 A1 | 12/2012 |
| WO | 2015196563 A1 | 12/2015 |
| WO | 2016177293 A1 | 11/2016 |
| WO | 2016187066 A1 | 11/2016 |
| WO | 2017014507 A1 | 1/2017 |
| WO | 2017073844 A1 | 5/2017 |
| WO | 2017219783 A1 | 12/2017 |
| WO | 2018227494 A1 | 12/2018 |
| WO | 2019036841 A1 | 2/2019 |

OTHER PUBLICATIONS

OPPO, "Measurement Gap Configuration in MR-DC", 3GPP TSG-RAN2 Meeting AH2, R2-1706347, 4 pages, Qingdao, China, Jun. 27-29, 2017.
European Patent Application No. 17931744.1, Supplementary European Search Report, dated Sep. 9, 2020, 14 pages.
OPPO, "Measurement Gap Configuration in MR-DC OPPO", Oct. 2017, R2-1710236, Prague, Czech Republic.
Vivo, "Discussion on measurement gap", Oct. 2107, R2-1710929, Prague Czech Republic.
Qualcomm Inc., "Measurement capability and measurement gap handling in EN-DC," Oct. 2017, R2-1711564, Prague, Czech Republic.
NTT DOCOMO, Inc., "Measurement Gap Configuration signalling design," Oct. 2017, R2-1711751, Prague Czech Republic.
Huawei, HiSilicon, "Measurement gap configuration in NR," Oct. 2017, R2-1710574, Prague, Czech Republic.
International Search Report issued in corresponding International Application No. PCT/CN2017/088503, dated Feb. 24, 2018, 42 pages.
Written Opinion of the International Searching Authority issued in corresponding International Application No. PCT/CN2017/088503, dated Feb. 24, 2018, 7 pages.
First Office action issued in corresponding Chilean Application No. 201903623, dated Feb. 16, 2021, 21 pages.
Supplementary European Search Report issued in corresponding European Application No. EP 17 91 3520, dated Apr. 28, 2020, 11 pages.
Communication Pursuant to Article 94(3) EPC issued in corresponding European Application No. EP 17 91 3520.7, dated Nov. 16, 2020, 5 pages.
First Office Action (Inquiry) of the Substantive Examination issued in corresponding Russian Application No. 2019145329, dated Aug. 26, 2020, 13 pages.
First Office action issued in corresponding Canadian Application No. 3,065,414, dated Feb. 1, 2021, 4 pages.
First Office action issued in corresponding India Application No. 201917051497, dated Feb. 25, 2021, 7 pages.
Notification of Reason for Refusal issued in corresponding Korean Application No. 10-2019-7036097, dated Mar. 11, 2021, 21 pages.
Search Report issued in corresponding Japanese Application No. 2019-565211, dated Apr. 30, 2021, 50 pages.
First Non-final Office action issued in corresponding U.S. Appl. No. 16/696,723, dated Feb. 20, 2020, 9 pages.
Second Non-final Office action issued in corresponding U.S. Appl. No. 16/696,723, dated Aug. 13, 2020, 11 pages.
"Measurement gap for NR", Agenda item: 10.4.1.3, Source: Samsung, 3GPP TSG-RAN WG2 Meeting #97bis R2-1702981, Spokane, WA, USA, Apr. 3-7, 2017 (revised from R2-1701293), 3 pages.
"Issues for measurement gap with beam sweeping and sparse reference signals", Agenda Item: 10.4.1.3, Source Huawei, HiSilicon, 3GPP TSG-RAN WG2#97bis R2-1703460, Spokane, Washington, USA, Apr. 3-7, 2017, 3 pages.
"General LTE-NR DC measurement consideration", Agenda Item: 10.2.3, Source: Huawei, HiSilicon, 3GPP TSG-RAN WG2 Meeting #98 R2-1705134, Hangzhou, China, Apr. 15-19, 2017, 3 pages.
"RRC information exchange for EN-DC", Agenda Item: 10.9.1, Source: Huawei, 3GPP TSG-RAN WG3 Meeting #96 R3-171878, Hangzhou, China, May 15-19, 2017, 2 pages.
"Summary of email discussion [97bis#10][NR] MN/SN measurement coordination", Agenda Item: 10.2.3, Source: NTT Docomo, Inc., 3GPP TSG-RAN WG2 #98 R2-1704138, Hangzhou, China, May 15-19, 2017, 15 pages.
Second Office action issued in corresponding Chilean Application No. 201903623, dated May 20, 2021, 22 pages.
First Office action issued in corresponding Chinese Application No. 202010362847.X, dated May 25, 2021, 26 pages.
Communication Pursuant to Article 94(3) EPC issued in corresponding European Application No. EP 17 931 744.1, dated Jun. 16, 2021, 7 pages.
Notification of Reason for Refusal issued in corresponding Japanese Application No. 2019-565211, dated May 17, 2021, 9 pages.
First Office action issued in corresponding India Application No. 202017023792, dated Jun. 25, 2021, 6 pages.
The Second Office Action issued in corresponding Chinese Application No. 202010362847.X, dated Aug. 23, 2021, 23 pages.
The First Office action issued in corresponding Taiwanese Application No. 107120594 dated Jul. 28, 2021, 16 pages.
The First Office action issued in corresponding Japanese Application No. 2020-524787 dated Sep. 14, 2021, 15 pages.

(56) References Cited

OTHER PUBLICATIONS

"Control plane for support of tight interworking between 5G NR and LTE", Agenda Item: 9.4.3.1, Source: CATT, 3GPP TSG RAN WG2 Meeting #94, R2-163467, Nanjing, China, May 23-27, 2016, 4 pages.
Notification of Reason for Refusal issued in corresponding Korean Application No. 10-2020-7015619, dated Oct. 29, 2021, 11 pages.

\* cited by examiner

METHOD FOR SETTING MEASUREMENT INTERVAL AND NETWORK DEVICE

CROSS-REFERENCE TO RELATED APPLICATION

This application is a continuation of and claims priority to International Patent Application No. PCT/CN2017/110254, filed on Nov. 9, 2017, the contents of which is hereby incorporated by reference in its entirety.

BACKGROUND OF THE INVENTION

Technical Field

Implementations of the present disclosure relate to the communications field, and more specifically, to a method for configuring a measurement gap, a network device, and a terminal device.

Related Art

People pursue high speed, low latency, high-speed mobility, and high energy efficiency in their mobile communications technology, that is ever-developing into more complex and diverse forms. With regard to this, the 3rd generation partnership project (The 3rd Generation Partnership Project, 3GPP) international standard organization started to develop fifth-generation mobile communications technology (5-Generation, 5G). Main application scenarios of 5G are: enhanced mobile broadband (Enhance Mobile Broadband, eMBB), ultra-reliable and low latency communications (Ultra-Reliable and Low Latency Communications, URLLC), and massive machine type of communication (massive machine type communication, mMTC).

In the early deployment of a new radio (New Radio, NR) system, it has been difficult to obtain complete NR coverage, so that typical network coverage is a model with wide-area coverage of a long term evolution (Long Term Evolution, LTE) system and island coverage of the NR system. In addition, a large quantity of LTE systems are deployed below 6 gigahertz (GHz), there are few spectra below 6 GHz that can be used for 5G. Therefore, for the NR system, applications of spectra above 6 GHz need be researched, but high-band coverage is limited and signal fading is fast.

In the related art, to protect investment of mobile operators in LTE systems in the early stage, a tight interworking (tight interworking) working mode between an LTE system and an NR system is put forward. Specifically, LTE-NR dual connection (Dual Connection, DC) is supported by a combination of bandwidths (band) to transmit data, thereby improving a system throughput.

SUMMARY OF THE INVENTION

A method for configuring a measurement gap, a network device, and a terminal device are provided.

According to a first aspect, a method for configuring a measurement gap is provided, and includes: generating, by a first network device, indication information when determining that a terminal device needs to measure a first frequency at which a second network device is located, where the indication information is used for indicating the terminal device to measure the first frequency; and transmitting, by the first network device, the indication information to the terminal device.

In the implementations of the present disclosure, when needing the terminal device to measure the first frequency at which the second network device is located, the first network device transmits, to the terminal device, the indication information, which is used for indicating the terminal device to measure the first frequency.

In some implementations, the method further includes: receiving, by the first network device, a first message transmitted by the terminal device, where the first message includes a message, which is used for requesting the first network device to configure a first measurement gap for the terminal device, and the first measurement gap is used for measuring the first frequency by the terminal device; and transmitting, by the first network device, a second message to the second network device according to the first message, where the second message includes a message, which is used for requesting the second network device to configure the first measurement gap for the terminal device.

In some implementations, the method further includes: receiving, by the first network device, a response message of the second message transmitted by the second network device, where the response message of the second message includes the first measurement gap; and transmitting, by the first network device, a response message of the first message to the terminal device according to the response message of the second message, where the response message of the first message includes the first measurement gap, to make the terminal device measure the first frequency according to the first measurement gap.

In some implementations, the indication information is more specifically used for indicating the terminal device to measure the first frequency according to a second measurement gap.

In the implementations of the present disclosure, when needing the terminal device to measure the frequency at which the second network device is located, the first network device can learn a case in which the second network device configures the measurement gap for the terminal device.

In some implementations, before the generating indication information, the method further includes: transmitting, by the first network device, a third message to the second network device, where the third message includes a message, which is used for requesting the second network device to configure the second measurement gap for the terminal device; and receiving, by the first network device, a response message of the third message transmitted by the second network device, where the response message of the third message includes at least one of: a configuration result of the second measurement gap or the second measurement gap; and the generating indication information includes: generating, by the first network device, the indication information according to the response message of the third message.

In some implementations, the second measurement gap is configured by the second network device for the terminal device before or after the second network device receives the third message.

In some implementations, the first network device and the second network device belong to different communications systems.

According to a second aspect, a method for configuring a measurement gap is provided, and includes: receiving, by a terminal device, indication information transmitted by a first network device, where the indication information is used for indicating the terminal device to measure a first frequency at which the second network device is located; and measuring, by the terminal device, the first frequency according to the indication information.

In some implementations, the method further includes: transmitting, by the terminal device, a first message to the first network device, where the first message includes a message, which is used for requesting the first network device to configure a first measurement gap for the terminal device, to make the first network device transmit a second message to the second network device according to the first message, where the second message includes a message, which is used for requesting the second network device to configure the first measurement gap for the terminal device; and receiving, by the terminal device, a response message of the first message transmitted by the first network device or the second network device, where the response message of the first message includes the first measurement gap.

In some implementations, the method further includes: transmitting, by the terminal device, a fourth message to the second network device, where the fourth message includes a message, which is used for requesting the second network device to configure a first measurement gap for the terminal device; and receiving, by the terminal device, a response message of the fourth message transmitted by the first network device or the second network device, where the response message of the fourth message includes the first measurement gap.

In some implementations, the fourth message includes identification information of the first network device.

In some implementations, the indication information is more specifically used for indicating the terminal device to measure the first frequency according to a second measurement gap.

In some implementations, the second measurement gap is configured for the terminal device before or after the second network device receives a third message transmitted by the first network device, and the third message includes a message, which is used for requesting the second network device to allocate the second measurement gap to the terminal device.

In some implementations, the first network device and the second network device belong to different communications systems.

According to a third aspect, a method for configuring a measurement gap is provided, and includes: receiving, by a second network device, a third message transmitted by a first network device, where the third message includes a message, which is used for requesting the second network device to configure a second measurement gap for a terminal device; and transmitting, by the second network device, a response message of the third message to the first network device, where the response message of the third message includes at least one of: a configuration result of the second measurement gap or the second measurement gap, to make the first network device generate indication information according to the response message of the third message, and the indication information is used for indicating the terminal device to measure, according to the second measurement gap, a first frequency at which the second network device is located.

In some implementations, the second measurement gap is configured by the second network device for the terminal device after or before the second network device receives the third message.

In some implementations, the first network device and the second network device belong to different communications systems.

According to a fourth aspect, a network device is provided, and includes: a processing unit, configured to: generate indication information when determining that a terminal device needs to measure a first frequency at which a second network device is located, where the indication information is used for indicating the terminal device to measure the first frequency; and a transceiver unit, configured to transmit the indication information to the terminal device.

According to a fifth aspect, a network device is provided, and includes: a processor, configured to: generate indication information when determining that a terminal device needs to measure a first frequency at which a second network device is located, where the indication information is used for indicating the terminal device to measure the first frequency; and a transceiver, configured to transmit the indication information to the terminal device.

According to a sixth aspect, a network device is provided, and includes a transceiver unit, where the transceiver unit is configured to: receive a third message transmitted by a first network device, where the third message includes a message, which is used for requesting the second network device to configure a second measurement gap for a terminal device; and transmit a response message of the third message to the first network device, where the response message of the third message includes at least one of: a configuration result of the second measurement gap or the second measurement gap, to make the first network device generate indication information according to the response message of the third message, and the indication information is used for indicating the terminal device to measure, according to the second measurement gap, a first frequency at which the second network device is located.

According to a seventh aspect, a terminal device is provided, and includes a transceiver and a processor, where the transceiver is configured to: receive a third message transmitted by a first network device, where the third message includes a message, which is used for requesting the second network device to configure a second measurement gap for a terminal device; and transmit a response message of the third message to the first network device, where the response message of the third message includes at least one of: a configuration result of the second measurement gap or the second measurement gap, to make the first network device generate indication information according to the response message of the third message, and the indication information is used for indicating the terminal device to measure, according to the second measurement gap, a first frequency at which the second network device is located.

According to an eighth aspect, a terminal device is provided, and includes: a transceiver unit, configured to receive indication information transmitted by a first network device, where the indication information is used for indicating the terminal device to measure a first frequency at which a second network device is located; and a measurement unit, configured to measure the first frequency according to the indication information.

According to a ninth aspect, a network device is provided, and includes: a transceiver, configured to receive indication information transmitted by a first network device, where the indication information is used for indicating the terminal device to measure a first frequency at which a second network device is located; and a processor, configured to measure the first frequency according to the indication information.

According to a tenth aspect, a computer-readable medium is provided, and is configured to store a computer program, where the computer program includes an instruction, which is used for performing the method implementation according to the foregoing first aspect, second aspect, or third aspect.

According to an eleventh aspect, a computer chip is provided, and includes: an input interface, an output interface, at least one processor, and a memory, where the processor is configured to execute code in the memory, and when the code is executed, the processor may implement respective processes performed by a terminal device in the method for configuring a measurement gap in the foregoing second aspect and various implementations.

According to a twelfth aspect, a computer chip is provided, and includes: an input interface, an output interface, at least one processor, and a memory, where the processor is configured to execute code in the memory, and when the code is executed, the processor may implement respective processes performed by a network device in the method for configuring a measurement gap in the foregoing first aspect or third aspect.

According to a thirteenth aspect, a communications system is provided, including the foregoing network device and the foregoing terminal device.

DETAILED DESCRIPTION OF THE INVENTION

Figure 1:
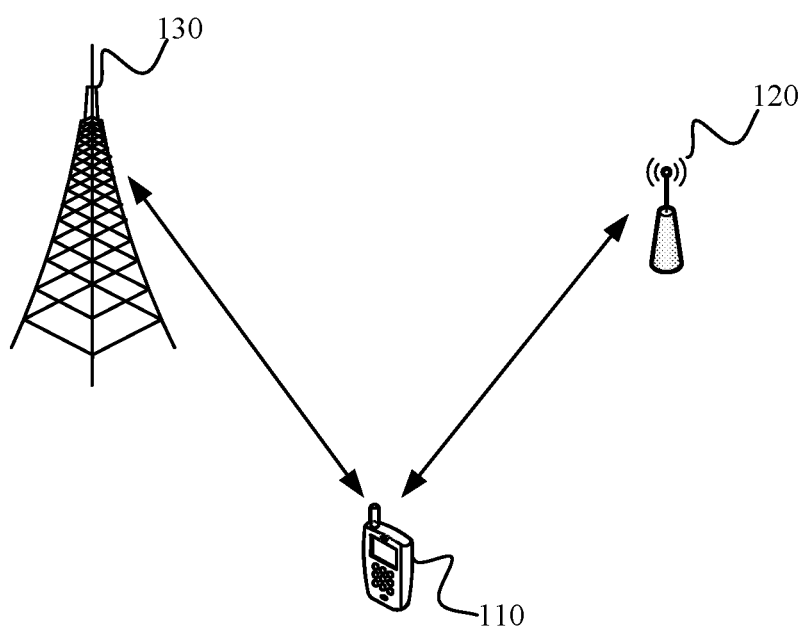
FIG. 1 shows an example of an application scenario according to the present disclosure.

FIG. 1 is a schematic diagram of an application scenario according to an implementation of the present disclosure.

As shown in FIG. 1, a terminal device 110 is connected to a first network device 130 in a first communications system and a second network device 120 in a second communications system. For example, the first network device 130 is a network device in a long term evolution (Long Term Evolution, LTE) system, and the second network device 120 is a network device in a new radio (New Radio, NR) system.

The first network device 130 and the second network device 120 each may include a plurality of cells.

However, before the terminal device 110 performs a cell handover, the terminal device 110 normally measures power (signal quality) of a target cell and reports it to the first network device 130. The first network device 130 determines whether to allow the terminal device 110 to hand over to the target cell.

It can be found that if a frequency of the target cell is the same as that of a present cell (intra-frequency measurement), the terminal device 110 can relatively easily measure the signal quality of the target cell. However, if their frequencies are different (inter-frequency measurement), it would be difficult for the terminal device 110 to measure the signal quality of the target cell.

In a logical sense only, a simplest inter-frequency measurement solution is to implement two sets of radio frequency (RF) transceivers on UE. However, practical difficulties exist in the dual RF transceiver solution. One problem is that extra costs are required to implement an additional transceiver, resulting in excessive costs. Another problem is possible interference between a current frequency and a target frequency particularly when the two frequencies are close, especially, for a dual-link scenario.

To resolve the foregoing problems, in the implementations of the present disclosure, a method for configuring a measurement gap by a network device for a terminal device is provided. In a dual-link scenario, a measurement gap (measurement gap) is configured for the terminal device 110, so that the measurement gap configured for the terminal device 110 may be used for performing inter-frequency measurement or intra-frequency measurement. Specifically, the terminal device 110 may handover to the target cell and perform signal quality measurement, and then hand over back to the present cell (to resume normal transmission and reception).

In other words, no date needs to be transmitted or received within the measurement gap (the present cell) configured for the terminal device.

Further, in the implementations of the present disclosure, when the first network device 130 needs the terminal device 110 to measure a frequency of the second network device 120, it is likely that the terminal device 110 needs a group of gaps, that is, a network device needs a gap.

For example, a radio frequency (FR1) supporting an LTE system is independent of an FR2 supporting an NR system. That is, the work frequency between the terminal device 110 and the first network device 130 is different from that between terminal device 110 and the second network device 120, so that for the terminal device 110, the gap configured for the FR1 is independent of the gap configured for the FR2.

In this case, because in an LTE-NR scenario, for an NR side, configuring which frequencies as a secondary cell (Secondary Cell, SCell) is decided by the second network device 120. Therefore, if the first network device 130 hopes to measure, by the terminal device 110, the frequency FR2 at which the second network device 120 is located, the first network device 130 does not know whether the second network device 120 needs to configure a gap. Therefore, it is likely that a measurement initiator may exert an impact on system operation when the measurement initiator measures a measured end.

For example, if the second network device 120 also configures that the FR2 at which the terminal device 110 works is not equal to the FR1, and the second network device 120 does not configure a gap for the terminal device 110, the terminal device 110 needs to configure a gap.

For another example, if the second network device 120 has configured a gap for the terminal device 110, the terminal device 110 does not need to reconfigure the gap.

For another example, if the second network device 120 has configured that the FR2 at which the terminal device 110 works equals the FR1, the terminal device 110 does not need to reconfigure the gap.

To resolve the foregoing problem, in the implementations of the present disclosure, a method for configuring a measurement gap is provided, when needing the terminal device 110 to measure the frequency at which the second network device 120 is located, the first network device 130 can learn a case in which the second network device 120 configures the measurement gap for the terminal device 110.

It should be understood that FIG. 1 shows an example of an application scenario according to the present disclosure, and this implementation of the present disclosure is not limited to FIG. 1.

For example, a communications system to which this implementation of the present disclosure is applicable may include at least a plurality of network devices in the first communications system and/or a plurality of network devices in the second communications system.

For another example, in this implementation of the present disclosure, the first communications system is different from the second communications system, but specific types of the first communications system and the second communications system are not limited. For example, the first communications system and the second communications system may be various communications systems, such as: a global system for mobile communications (Global System for Mobile communications, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD), and universal mobile telecommunications system (Universal Mobile Telecommunications System, UMTS).

In addition, the implementations of the present disclosure are described with reference to network devices (the first network device to a fourth network device) and a terminal device.

The network device may refer to any entity configured to transmit or receive a signal on a network side, and for example, may be machine type communication (MTC) user equipment, a base transceiver station (Base Transceiver Station, BTS) in a GSM or CDMA system, a NodeB (NodeB) in a WCDMA system, an evolved NodeB (evolved NodeB, eNB or eNodeB) in an LTE system, a base station device in a 5G network, or the like.

The terminal device 110 may be any terminal device. Specifically, the terminal device may communicate with one or more core networks (Core Network) through a radio access network (Radio Access Network, RAN), may alternatively be referred to as an access terminal, user equipment (User Equipment, UE), a subscriber unit, a subscriber station, a mobile station, a mobile, a remote station, a remote terminal, a mobile device, a user terminal, a terminal, a wireless communications device, a user agent, or a user apparatus, and for example, may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, or another processing device connected to a wireless modem, an in-vehicle device, a wearable device, and a terminal device in a 5G network.

Figure 2:
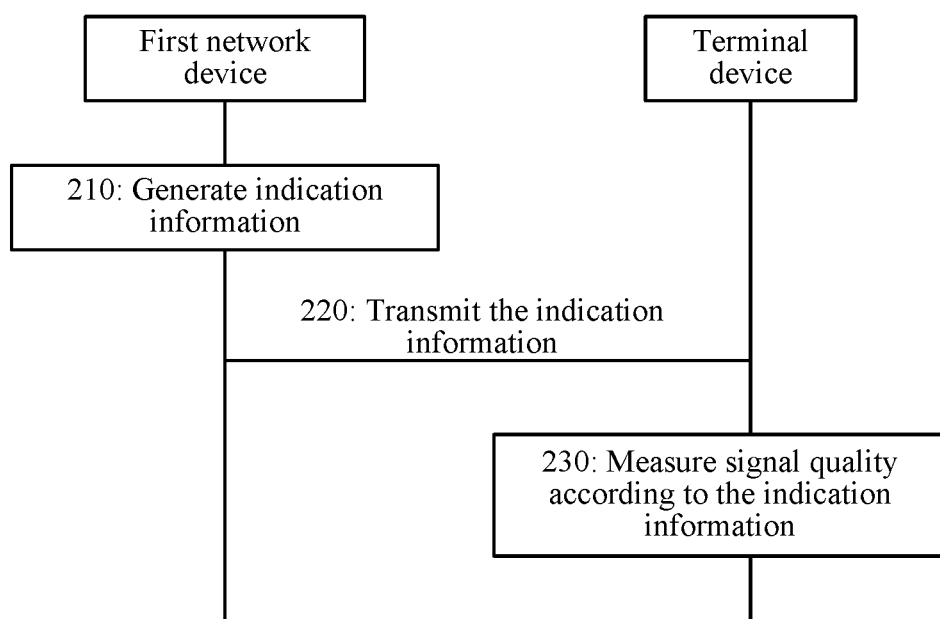
FIG. 2 is a schematic block diagram of a method for configuring a measurement gap according to an implementation of the present disclosure.

FIG. 2 is a schematic flowchart of a method for configuring a measurement gap according to an implementation of the present disclosure;

As shown in FIG. 2, the method includes:

210: A first network device generates indication information.

220: The first network device transmits the indication information to a terminal device.

230: The terminal device measures signal quality according to the indication information.

Specifically, the first network device generates indication information when determining that the terminal device needs to measure a first frequency at which a second network device is located, where the indication information is used for indicating the terminal device to measure the first frequency; and the first network device transmits the indication information to the terminal device. Correspondingly, for the terminal device, the terminal device receives the indication information transmitted by the first network device, and measures the first frequency according to the indication information.

It should be noted that in this implementation of the present disclosure, the first network device may instruct, without knowing whether the second network device is needed to configure a measurement gap for the terminal device, the terminal device to measure the first frequency.

That is, the terminal device may determine, after receiving the indication information, whether the second network device is needed to allocate a measurement gap when the terminal device measures the first frequency.

Specifically, if the second network device does not configure a measurement gap for the terminal device, and the second frequency is different from the first frequency at which the terminal device works, the terminal device may request the first network device or the second network device to configure a measurement gap used for measuring the first frequency.

It should be understood that in this implementation of the present disclosure, the first frequency may include at least one of: a center frequency or a bandwidth at which the second network device is located. This is not specifically limited in this implementation of the present disclosure.

An implementation in which the terminal device obtains the measurement gap is described below with regard to a case in which the terminal device needs the second network device to allocate a measurement gap.

In an implementation, the terminal device may transmit a first message to the first network device, where the first message includes a message, which is used for requesting the first network device to configure a first measurement gap for the terminal device, to make the first network device transmit a second message to the second network device according to the first message, where the second message includes a message, which is used for requesting the second network device to configure the first measurement gap for the terminal device; and the terminal device receives a response message of the first message transmitted by the first network device or the second network device, where the response message of the first message includes the first measurement gap.

For the first network device, the first network device receives a first message transmitted by the terminal device; and the first network device transmits a second message to the second network device according to the first message.

In short, the terminal device may first request the first measurement gap from the first network device, and then, the first network device requests the first measurement gap from the second network device. Therefore, the first network device or the second network device transmits a response message carrying the first measurement gap to the terminal device.

Specifically, the first network device receives a response message of the second message transmitted by the second network device, where the response message of the second message includes the first measurement gap; and the first network device transmits a response message of the first message to the terminal device according to the response message of the second message, where the response message of the first message includes the first measurement gap, to make the terminal device measure the first frequency according to the first measurement gap.

In another implementation, the terminal device transmits a fourth message to the second network device, where the fourth message includes a message, which is used for requesting the second network device to configure a first measurement gap for the terminal device; and the terminal device receives a response message of the fourth message transmitted by the first network device or the second network device, where the response message of the fourth message includes the first measurement gap.

In other words, after receiving the fourth message transmitted by the terminal device, the second network device transmits a response message of the fourth message to the terminal device.

It should be understood that in this implementation of the present disclosure, the first network device may directly instruct the terminal device to measure the first frequency, or may directly instruct the terminal device to measure the first frequency according to a measurement gap.

With regard to a case in which the first network device knows whether the second network device needs to allocate a measurement gap to the terminal device, an implementation of indicating the terminal device to measure the first frequency at which the first network device is located is described below.

Specifically, the first network device generates indication information when determining that the terminal device needs to measure a first frequency at which a second network device is located, where the indication information is more specifically used for indicating the terminal device to measure the first frequency according to a second measurement gap.

In an implementation, the first network device may determine, before generating the indication information, whether the second network device needs to allocate a measurement gap to the terminal device.

Figure 3:
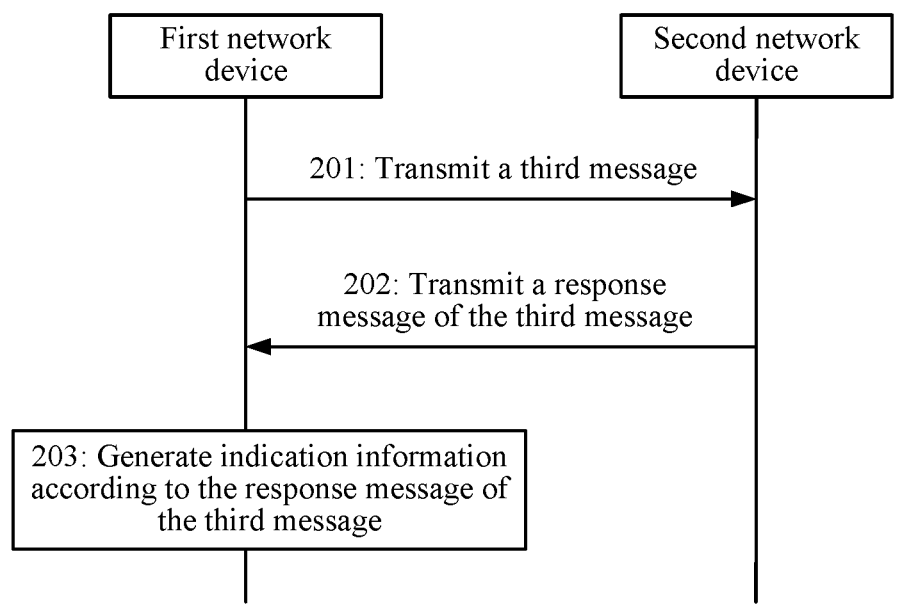
FIG. 3 is another schematic block diagram of a method for configuring a measurement gap according to an implementation of the present disclosure.

Specifically, as shown in FIG. 3, a procedure in which the first network device determines whether the second network device needs to allocate a measurement gap to the terminal device includes:

201: The first network device transmits a third message to the second network device.

202: The second network device transmits a response message of the third message to the first network device.

203: The first network device generates the indication information according to the response message of the third message.

Specifically, the first network device may transmit, before generating the indication information, a third message to the second network device, where the third message includes a message, which is used for requesting the second network device to configure the second measurement gap for the terminal device; and the first network device receives a response message of the third message transmitted by the second network device, where the response message of the third message includes at least one of: a configuration result of the second measurement gap or the second measurement gap; and further, the first network device may generate the indication information according to the response message of the third message.

It should be understood that the second measurement gap is configured by the second network device for the terminal device after or before the second network device receives the third message. This is not specifically limited in this implementation of the present disclosure.

That is, if the second network device has configured the second measurement gap for the terminal device, the first network device may instruct the terminal device to measure the first frequency by using the second measurement gap that the terminal device already has; and if the second network device does not configure the second measurement gap for the terminal device, the second network device configures the second measurement gap for the terminal device, and the first network device or the second network device instructs the terminal device to measure the first frequency by using the configured second measurement gap.

Figure 4:
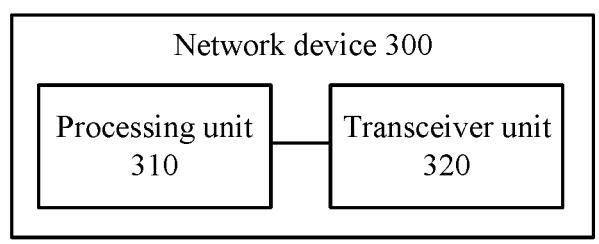
FIG. 4 is a schematic block diagram of a network device according to an implementation of the present disclosure.

In addition, in the implementations of the present disclosure, a network device is further provided. As shown in FIG. 4, a network device 300 includes: a processing unit 310, configured to: generate indication information when determining that a terminal device needs to measure a first frequency at which a second network device is located, where the indication information is used for indicating the terminal device to measure the first frequency; and a transceiver unit 320, configured to transmit the indication information to the terminal device.

In at least one implementation, the transceiver unit 320 is further configured to: receive a first message transmitted by the terminal device, where the first message includes a message, which is used for requesting the network device to configure a first measurement gap for the terminal device, and the first measurement gap is used for measuring the first frequency by the terminal device; and transmit a second message to the second network device according to the first message, where the second message includes a message, which is used for requesting the second network device to configure the first measurement gap for the terminal device.

In at least one implementation, the transceiver unit 320 is further configured to: receive a response message of the second message transmitted by the second network device, where the response message of the second message includes the first measurement gap; and transmit a response message of the first message to the terminal device according to the response message of the second message, where the response message of the first message includes the first measurement gap, to make the terminal device measure the first frequency according to the first measurement gap.

In at least one implementation, the indication information is more specifically used for indicating the terminal device to measure the first frequency according to a second measurement gap.

In at least one implementation, the transceiver unit 320 is further configured to: transmit a third message to the second network device before the processing unit 310 generates the indication information, where the third message includes a message, which is used for requesting the second network device to configure the second measurement gap for the terminal device; and receive a response message of the third message transmitted by the second network device, where the response message of the third message includes at least one of: a configuration result of the second measurement gap or the second measurement gap. The processing unit 310 is specifically configured to: generate the indication information according to the response message of the third message.

In at least one implementation, the second measurement gap is configured by the second network device for the terminal device after or before the second network device receives the third message.

In at least one implementation, the network device and the second network device belong to different communications systems.

In the implementations of the present disclosure, another network device is provided. Specifically, as shown in FIG. 4, the transceiver unit 320 is configured to: receive a third message transmitted by a first network device, where the third message includes a message, which is used for requesting the second network device to configure a second measurement gap for a terminal device; and transmit a response message of the third message to the first network device, where the response message of the third message includes at least one of: a configuration result of the second measurement gap or the second measurement gap, to make the first network device generate indication information according to the response message of the third message, and the indication information is used for indicating the terminal device to measure, according to the second measurement gap, a first frequency at which the second network device is located.

In at least one implementation, the second measurement gap is configured by the second network device for the terminal device after or before the second network device receives the third message.

In at least one implementation, the first network device and the second network device belong to different communications systems.

Figure 5:
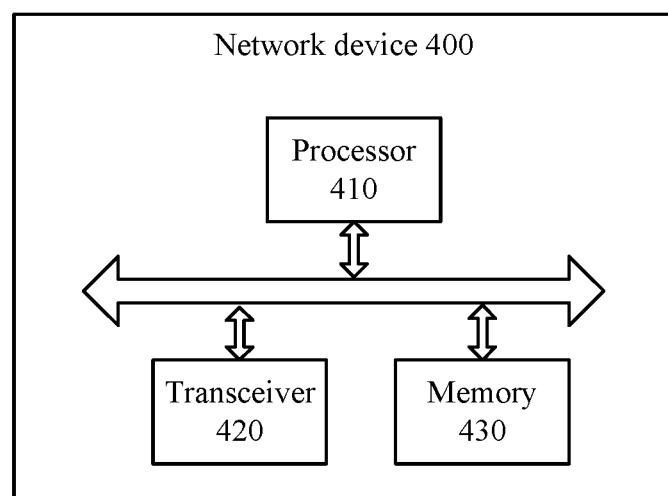
FIG. 5 is a schematic block diagram of another network device according to an implementation of the present disclosure.

It should be noted that the processing unit 310 may be implemented by a processor, and the transceiver unit 320 may be implemented by a transceiver. As shown in FIG. 5, a network device 400 may include a processor 410, a transceiver 420, and a memory 430. The memory 430 may be configured to store indication information and may be further configured to store code, an instruction, and the like executed by the processor 410. Components in the network device 400 are connected by using a bus system. The bus system may also include a power supply bus, a control bus, and a status signal bus in addition to a data bus.

The network device 400 shown in FIG. 5 can implement processes implemented by the network device in the method implementations shown in FIG. 2 and FIG. 3. To avoid repeated descriptions, details are not described herein again.

Figure 6:
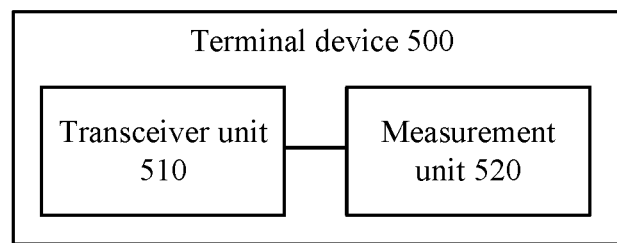
FIG. 6 is a schematic block diagram of a terminal device according to an implementation of the present disclosure.

FIG. 6 is a schematic block diagram of a terminal device according to an implementation of the present disclosure.

Specifically, as shown in FIG. 6, the terminal device 500 includes: a transceiver unit 510, configured to receive indication information transmitted by a first network device, where the indication information is used for indicating the terminal device to measure a first frequency at which a second network device is located; and a measurement unit 520, configured to measure the first frequency according to the indication information.

In at least one implementation, the transceiver unit 510 is further configured to: transmit a first message to the first network device, where the first message includes a message, which is used for requesting the first network device to configure a first measurement gap for the terminal device, to make the first network device transmit a second message to the second network device according to the first message, where the second message includes a message, which is used for requesting the second network device to configure the first measurement gap for the terminal device; and receive a response message of the first message transmitted by the first network device or the second network device, where response message of the first message includes the first measurement gap.

In at least one implementation, the transceiver unit 510 is further configured to: transmit a fourth message to the second network device, the fourth message includes a message, which is used for requesting the second network device to configure a first measurement gap for the terminal device; and receive a response message of the fourth message transmitted by the first network device or the second network device, where the response message of the fourth message includes the first measurement gap.

In at least one implementation, the fourth message includes identification information of the first network device.

In at least one implementation, the indication information is more specifically used for indicating the terminal device to measure the first frequency according to a second measurement gap.

In at least one implementation, the second measurement gap is configured for the terminal device before or after the second network device receives a third message transmitted by the first network device, and the third message includes a message, which is used for requesting the second network device to allocate the second measurement gap to the terminal device.

In at least one implementation, the first network device and the second network device belong to different communications systems.

Figure 7:
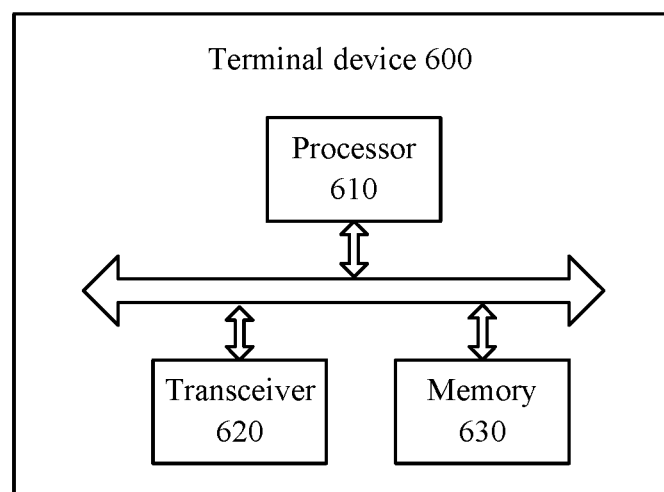
FIG. 7 is a schematic block diagram of another terminal device according to an implementation of the present disclosure.

It should be noted that the transceiver unit 510 may be implemented by a transceiver, and the measurement unit 520 may be implemented by a processor. As shown in FIG. 7, a terminal device 600 may include a processor 610, a transceiver 620, and a memory 630. The memory 630 may be configured to store indication information and may be further configured to store code, an instruction, and the like executed by the processor 610. Components in the terminal device 600 are connected by using a bus system. The bus system may also include a power supply bus, a control bus, and a status signal bus in addition to a data bus.

The terminal device 600 shown in FIG. 7 can implement processes implemented by the terminal device in the method implementation shown in FIG. 2. To avoid repeated descriptions, details are not described herein again.

It should be understood that the method implementation in the implementations of the present disclosure may be applied to a processor, or may be implemented by a processor.

In an implementation process, steps in the method implementations in the implementations of the present disclosure can be implemented by using a hardware integrated logical circuit in the processor, or by using instructions in a form of software. More specifically, the steps in the method disclosed in the implementations of the present disclosure may be directly implemented by a hardware decoding processor, or may be implemented by combining hardware and software modules in a decoding processor. The software modules may be located in a mature storage medium in the art, such as a random access memory, a flash memory, a read-only memory, a programmable read-only memory, an electronically erasable programmable memory, or a register. The storage medium is located in the memory, and a processor reads information in the memory and completes the steps in the foregoing methods in combination with hardware of the processor.

The processor may be an integrated circuit chip, having a signal processing capability, and may implement or execute methods, steps, and logical block diagrams disclosed in the implementations of the present disclosure. For example, the foregoing processor may be a general purpose processor, a digital signal processor (Digital Signal Processing, DSP), an application-specific integrated circuit (application-specific integrated circuit, ASIC), a field programmable gate array (Field Programmable Gate Array, FPGA), or other programmable logic devices, transistor logic devices, and discrete hardware components. In addition, the general processor may be a microprocessor or the processor may also be any common processor, and the like.

In addition, in the implementations of the present disclosure, the memory may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read only memory (electrical EPROM, EEPROM), or a flash memory. The volatile memory may be a random access memory (random access memory, RAM), and is used as an external cache. It should be understood that the foregoing memory is exemplary, rather than limitative. For example, in the implementations of the present disclosure, the memory may alternatively be a static random access memory (static RAM, SRAM), a dynamic random access memory (dynamic RAM, DRAM), or a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM) a direct memory rambus RAM (Direct Rambus RAM, DR RAM), and the like. That is, the memory in the system and method described in this specification intends to include, but is not limited to, these memories and any other memory of a suitable type.

Finally, it should be noted that the terms used in the implementations of the present disclosure and the attached claims are merely intended for exemplarily describing specific implementations rather than limiting the implementations of the present disclosure.

For example, "a", "an", and "the" of a singular form used in the implementations of the present disclosure and the attached claims aim to also include a plural form unless another meaning is clearly indicated in the context.

For another example, depending on the context, the word "when" used herein may be interpreted as "if", "assuming", "when", "in response to determining", or "in response to detecting". Similarly, depending on the context, the phrase "if determining" or "if detecting (a condition or an event of a statement)" may be interpreted as "when determining", "in response to determining", "when detecting (a condition or an event of a statement)", or "in response to (a condition or an event of a statement)".

A person of ordinary skill in the art may be aware that, in combination with the examples described in the implementations disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the implementations of the present disclosure.

It may be clearly understood by a person skilled in the art that, for the purpose of convenient and brief description, for a detailed working process of the system, apparatus, and unit, refer to a corresponding process in the method implementations. Details are not described herein again.

In the several implementations provided in the present application, it should be understood that the disclosed system, apparatus, and method may be implemented in other manners. For example, the described apparatus implementation is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the implementations of the present disclosure.

In addition, functional units in the implementations of the present disclosure may be integrated into one processing unit, or each of the units may exist alone physically, or two or more units are integrated into one unit.

When the software functions are implemented in a form of a software functional unit and sold or used as an independent product, the functions may be stored in a computer-readable storage medium. Based on such an understanding, the technical solutions of the implementations of the present disclosure essentially, or the part contributing to the related art, or some of the technical solutions may be implemented in a form of a software product. The software product is stored in a storage medium, and includes several instructions for indicating a computer device (which may be a personal computer, a server, or a network device) to perform all or some of the steps of the methods described in the implementations of the present disclosure. The foregoing storage medium includes: any medium that can store program code, such as a USB flash drive, a removable hard disk, a read-only memory, a random access memory, a magnetic disk, or an optical disc.

The foregoing content is merely specific implementations of the present disclosure, but is not intended to limit the protection scope of the present disclosure. Any variation or replacement readily figured out by a person skilled in the art within the technical scope disclosed in the present disclosure shall fall within the protection scope of the present disclosure. Therefore, the protection scope of the implementations of the present disclosure shall be subject to the protection scope of the claims.

In addition, functional units in the implementations of the present disclosure may be integrated into one processing unit, or each of the units may exist alone physically, or two or more units are integrated into one unit.

When the software functions are implemented in a form of a software functional unit and sold or used as an independent product, the functions may be stored in a computer-readable storage medium. Based on such an understanding, the technical solutions of the implementations of the present disclosure essentially, or the part contributing to the related art, or some of the technical solutions may be implemented in a form of a software product. The software product is stored in a storage medium, and includes several instructions for instructing a computer device (which may be a personal computer, a server, or a network device) to perform all or some of the steps of the methods described in the implementations of the present disclosure. The foregoing storage medium includes: any medium that can store program code, such as a USB flash drive, a removable hard disk, a read-only memory, a random access memory, a magnetic disk, or an optical disc.

The foregoing content is merely specific implementations of the present disclosure, but is not intended to limit the protection scope of the present disclosure. Any variation or replacement readily figured out by a person skilled in the art within the technical scope disclosed in the present disclosure shall fall within the protection scope of the present disclosure. Therefore, the protection scope of the implementations of the present disclosure shall be subject to the protection scope of the claims.

What is claimed is:

1. A method for frequency measurement, the method comprising:
   transmitting, by a first network device, a third message to a second network device, wherein the third message comprises a message, which is used for requesting the second network device to configure a second measurement gap for a terminal device;
   receiving, by the first network device, a response message of the third message transmitted by the second network device, wherein the response message of the third message comprises the second measurement gap;
   subsequent to the receiving, generating, by the first network device and according to the response message of the third message, indication information, wherein the indication information is used for indicating the terminal device to measure a first frequency at which the second network device is located, and wherein the indication information is further used for indicating the terminal device to measure the first frequency according to the second measurement gap, the first network device being a network device in a new radio system, and the second network device being a network device in a long term evolution (LTE) system; and
   transmitting, by the first network device, the indication information to the terminal device.

2. The method of claim 1 further comprising:
   receiving, by the first network device, a first message transmitted by the terminal device, wherein the first message comprises a message, which is used for requesting the first network device to configure a first measurement gap for the terminal device, and the first measurement gap is used by the terminal device to measure the first frequency; and
   transmitting, by the first network device, a second message to the second network device according to the first message, wherein the second message comprises a message, which is used for requesting the second network device to configure the first measurement gap for the terminal device.

3. The method of claim 2 further comprising:
   receiving, by the first network device, a response message of the second message transmitted by the second network device, wherein the response message of the second message comprises the first measurement gap; and
   transmitting, by the first network device, a response message of the first message to the terminal device according to the response message of the second message, wherein the response message of the first message comprises the first measurement gap make causes the terminal device to measure the first frequency according to the first measurement gap.

4. The method of claim 1 wherein the second measurement gap is configured by the second network device for the terminal device before or after the second network device receives the third message.

5. A method for frequency measurement, the method comprising:
   receiving, by a terminal device, indication information transmitted by a first network device, wherein the indication information is used for indicating the terminal device to measure a first frequency at which a second network device is located, and wherein the indication information is further used for indicating the terminal device to measure the first frequency according to a second measurement gap, the first network device being a network device in a long term evolution (LTE) system, and the second network device being a network device in a new radio (NR) system, wherein the second measurement gap is a measurement gap configured for the terminal device before or after the second network device receives a third message sent by the first network device, and the third message comprises a message used to request the second network device to allocate the second measurement gap to the terminal device; and
   measuring, by the terminal device, the first frequency according to the indication information.

6. The method of claim 5 further comprising:
   transmitting, by the terminal device, a first message to the first network device, wherein the first message comprises a message, which is used for requesting the first network device to configure a first measurement gap for the terminal device, to make the first network device transmit a second message to the second network device according to the first message, wherein the second message comprises a message, which is used for requesting the second network device to configure the first measurement gap for the terminal device; and
   receiving, by the terminal device, a response message of the first message transmitted by the first network device or the second network device, wherein the response message of the first message comprises the first measurement gap.

7. The method of claim 5 further comprising:
   transmitting, by the terminal device, a fourth message to the second network device, wherein the fourth message comprises a message, which is used for requesting the second network device to configure a first measurement gap for the terminal device; and
   receiving, by the terminal device, a response message of the fourth message transmitted by the first network device or the second network device, wherein the response message of the fourth message comprises the first measurement gap.

8. A terminal device, comprising:
   a receiver;
   a memory configured to store computer-executable instructions; and one or more processors in communication with the receiver and the memory and configured to execute the computer-executable instructions to:

receive indication information transmitted by a first network device, wherein the indication information is used for indicating the terminal device to measure a first frequency at which a second network device is located, and wherein the indication information is further used for indicating the terminal device to measure the first frequency according to a second measurement gap, the first network device being a network device in a new radio (NR) system, and the second network device being a network device in a Long Term Evolution (LTE) system, wherein the second measurement gap is configured for the terminal device before or after the second network device receives a third message transmitted by the first network device, and the third message comprises a message, which is used for requesting the second network device to allocate the second measurement gap to the terminal device; and measure the first frequency according to the indication information.

9. The terminal device of claim 8 wherein the one or more processors are further configured to execute computer-executable instructions to:

transmit a first message to the first network device, wherein the first message comprises a message, which is used for requesting the first network device to configure a first measurement gap for the terminal device, to make the first network device transmit a second message to the second network device according to the first message, wherein the second message comprises a message, which is used for requesting the second network device to configure the first measurement gap for the terminal device; and receive a response message of the first message transmitted by the first network device or the second network device, wherein the response message of the first message comprises the first measurement gap.

10. The terminal device of claim 8 wherein the one or more processors are further configured to execute computer-executable instructions to:

transmit a fourth message to the second network device, wherein the fourth message comprises a message, which is used for requesting the second network device to configure a first measurement gap for the terminal device; and receive a response message of the fourth message transmitted by the first network device or the second network device, wherein the response message of the fourth message comprises the first measurement gap.

11. The terminal device of claim 10 wherein the fourth message comprises identification information of the first network device.

* * * * *